(12) United States Patent
Tanaka

(10) Patent No.: US 8,384,960 B2
(45) Date of Patent: Feb. 26, 2013

(54) IMAGE FORMING APPARATUS

(75) Inventor: Sumito Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 484 days.

(21) Appl. No.: 12/784,887

(22) Filed: May 21, 2010

(65) Prior Publication Data

US 2010/0309525 A1  Dec. 9, 2010

(30) Foreign Application Priority Data

Jun. 3, 2009  (JP) ................. 2009-134515

(51) Int. Cl.
*G06K 15/00* (2006.01)
*H04N 1/40* (2006.01)
(52) U.S. Cl. ..................... 358/3.21; 358/3.22
(58) Field of Classification Search .......... None
See application file for complete search history.

(56) References Cited

U.S. PATENT DOCUMENTS

| | | | |
|---|---|---|---|
| 4,783,681 A | 11/1988 | Tanaka et al. | |
| 5,140,371 A | 8/1992 | Ishihara et al. | |
| 5,859,933 A | 1/1999 | Sasanuma et al. | |
| 6,418,281 B1 | 7/2002 | Ohki | |
| 7,385,737 B2 | 6/2008 | Zaima | |
| 2003/0128381 A1 | 7/2003 | Zaima | |
| 2009/0109453 A1* | 4/2009 | Nakahara | 358/1.9 |
| 2010/0271643 A1* | 10/2010 | Rapkin | 358/1.9 |

FOREIGN PATENT DOCUMENTS

| | | |
|---|---|---|
| JP | 7-131650 A | 5/1995 |
| JP | 2000-238341 A | 9/2000 |
| JP | 2003-202711 A | 7/2003 |

* cited by examiner

*Primary Examiner* — Douglas Tran
(74) *Attorney, Agent, or Firm* — Fitzpatrick, Cella, Harper & Scinto

(57) ABSTRACT

An image forming apparatus includes: an image bearing member; an image forming unit configured to form a toner image on the image bearing member based on an image input signal; a detection sensor configured to detect a detection image at multiple density levels, which is formed by the image forming unit; a correction unit configured to correct image output characteristics of the image forming unit with respect to the image input signal, based on a detection result of the detection sensor; and a change unit configured to change the density levels at which the detection image is formed so that the detection image is preferentially formed in a density area of a large absolute value of a rate of change of slope of the image output characteristics.

3 Claims, 16 Drawing Sheets

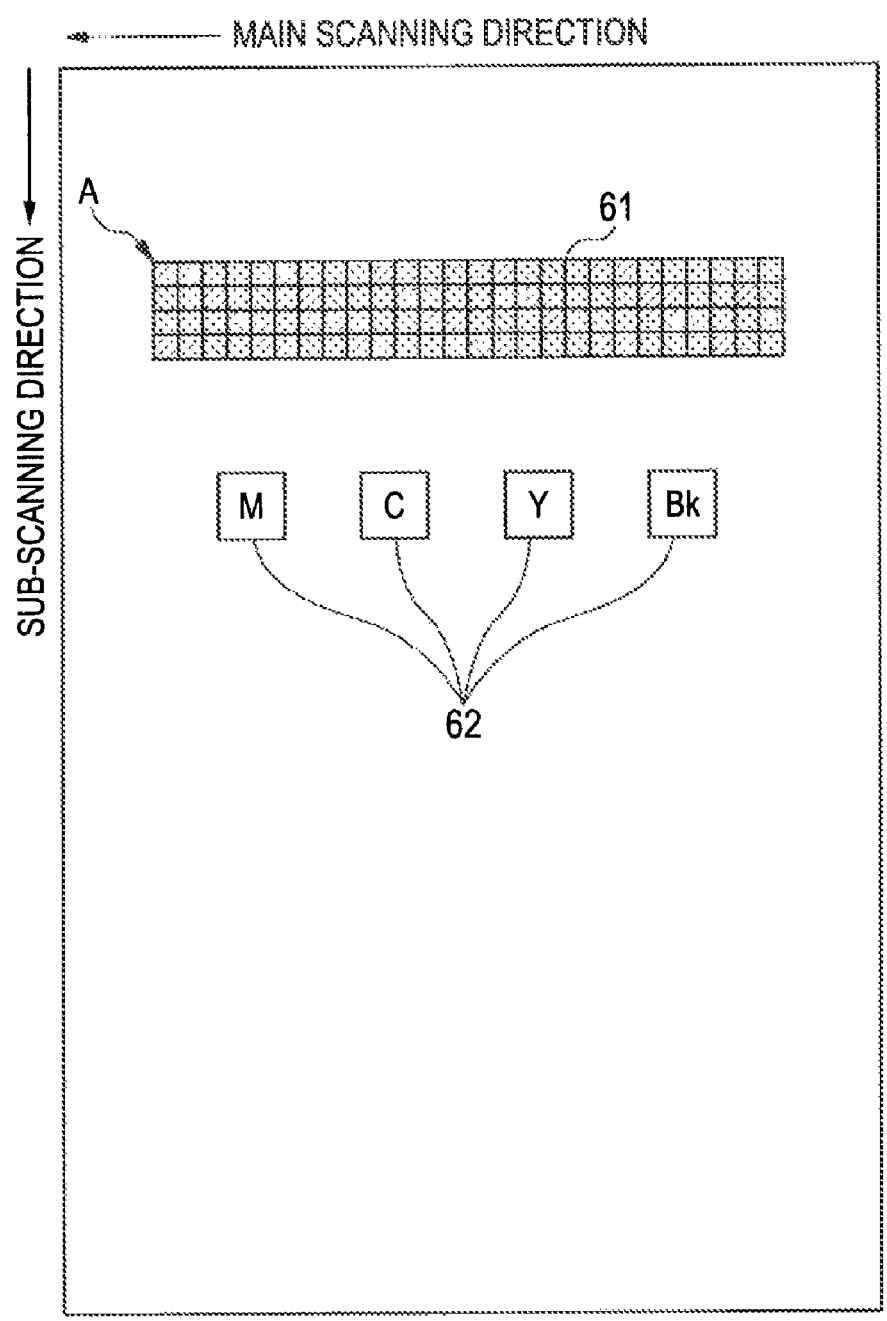

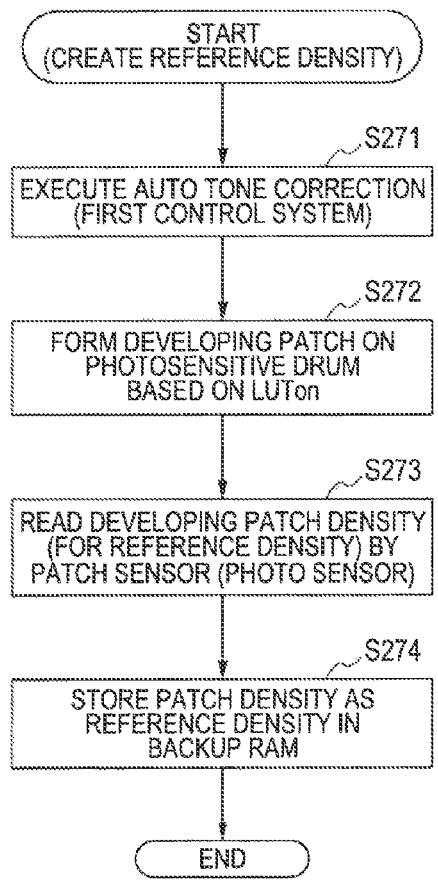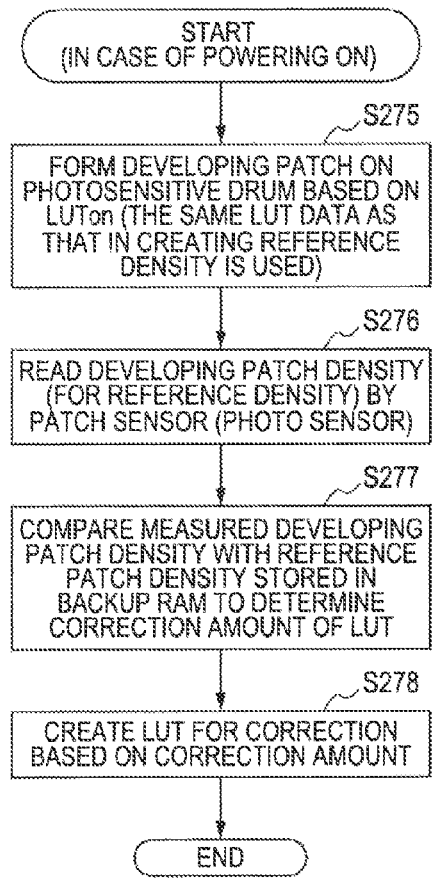

IMAGE FORMING APPARATUS

BACKGROUND OF THE INVENTION

1. Field of the Invention

The present invention relates to an image forming apparatus such as an electrophotographic copying machine or a printer.

2. Description of the Related Art

The following method is conventionally known as a method (hereinafter, referred as an "image control method") of adjusting image density characteristics of an image forming apparatus such as a copying machine or a printer.

The image forming apparatus forms a tone pattern including multiple patches on an image bearing member such as a photosensitive drum upon completion of warm-up operation after startup. The image forming apparatus then reads a density of the formed tone pattern, and based on the read density value, changes an operation of a circuit such as a gamma correcting circuit for determining image forming conditions, to thereby stabilize the quality of an image to be formed (for example, refer to Japanese Patent Application Laid-Open No. 2000-238341).

When fluctuations in environmental conditions change the tone characteristics of the image forming apparatus, a tone pattern is formed again on the image bearing member, read, and fed back again to the circuit such as a gamma correcting circuit for determining image forming conditions. As a result, image quality may be stabilized according to the fluctuations in environmental conditions.

When the image forming apparatus is used over a long period of time, where a read density of the tone pattern on the image bearing member and a density of an actually printed-out image may not match each other. Thus, there is known a method of forming a tone pattern on a recording material, and correcting image forming conditions based on the density value of the tone pattern (for example, refer to Japanese Patent Application Laid-Open No. H07-131650).

There is known a method of correcting a gamma look-up table (γLUT) or creating a γLUT correction table based on density information of one image pattern, and adding correction information to the gamma correcting circuit so as to compensate for the shortfall in correction information. In this regard, calibration is known to be performed for correcting a change in output characteristics caused by an individual difference of the apparatus such as a printer or a change in output environment (for example, refer to Japanese Patent Application Laid-Open No. 2003-202711).

The above-mentioned conventional technologies have the following problems. Specifically, a tone pattern having a patch of a fixed density level is conventionally used for creating a tone correction table. On the other hand, a great change in tone reproduction may not always occur at the same place, depending on variance on engine characteristics between the apparatus, environmental changes or materials.

However, the density level of formed patches is fixed, and hence it is difficult to sufficiently correct a density level of a great tone change. The number of patches to be formed may be increased to preferentially correct the density level of which change in tone reproduction is great. However, the increase in the number of patches may result in an extended period of down-time.

SUMMARY OF THE INVENTION

In view of the above-mentioned circumstances, the present invention has been made, and therefore, it is an object of the invention to provide an image forming apparatus for detecting patch patterns to correct image forming conditions, which is capable of preferentially correcting a place where tone reproduction greatly varies, without increasing a number of patch patterns.

In order to attain the above-mentioned object, according to an aspect of the invention, there is provided an image forming apparatus, including, an image bearing member, an image forming unit configured to form a toner image on the image bearing member based on an image input signal, a detection sensor configured to detect a detection image at multiple density levels, which is formed by the image forming unit, a correction unit configured to correct image output characteristics of the image forming unit with respect to the image input signal, based on a detection result of the detection sensor, and a change unit configured to change the multiple density levels at which the detection image is formed so that the detection image is preferentially formed in a density area in which an absolute value of a rate of change of slope of the image output characteristics is large.

Further features of the present invention will become apparent from the following description of exemplary embodiments with reference to the attached drawings.

BRIEF DESCRIPTION OF THE DRAWINGS

FIG. 8 illustrates an example of a test print 1.

FIGS. 16A and 16B are flowcharts illustrating target value setting processing of a second control system.

DESCRIPTION OF THE EMBODIMENTS

In the following, an image forming apparatus according to the present invention will be described in further detail with reference to the accompanying drawings. However, it is to be understood that the scope of the invention is not limited to the relative configuration of constituent elements, the expressions, and the numeric values disclosed in the exemplary embodiments described below, unless otherwise specified.

(First Exemplary Embodiment)

(Overall Configuration of Image Forming Apparatus)

Figure 1:
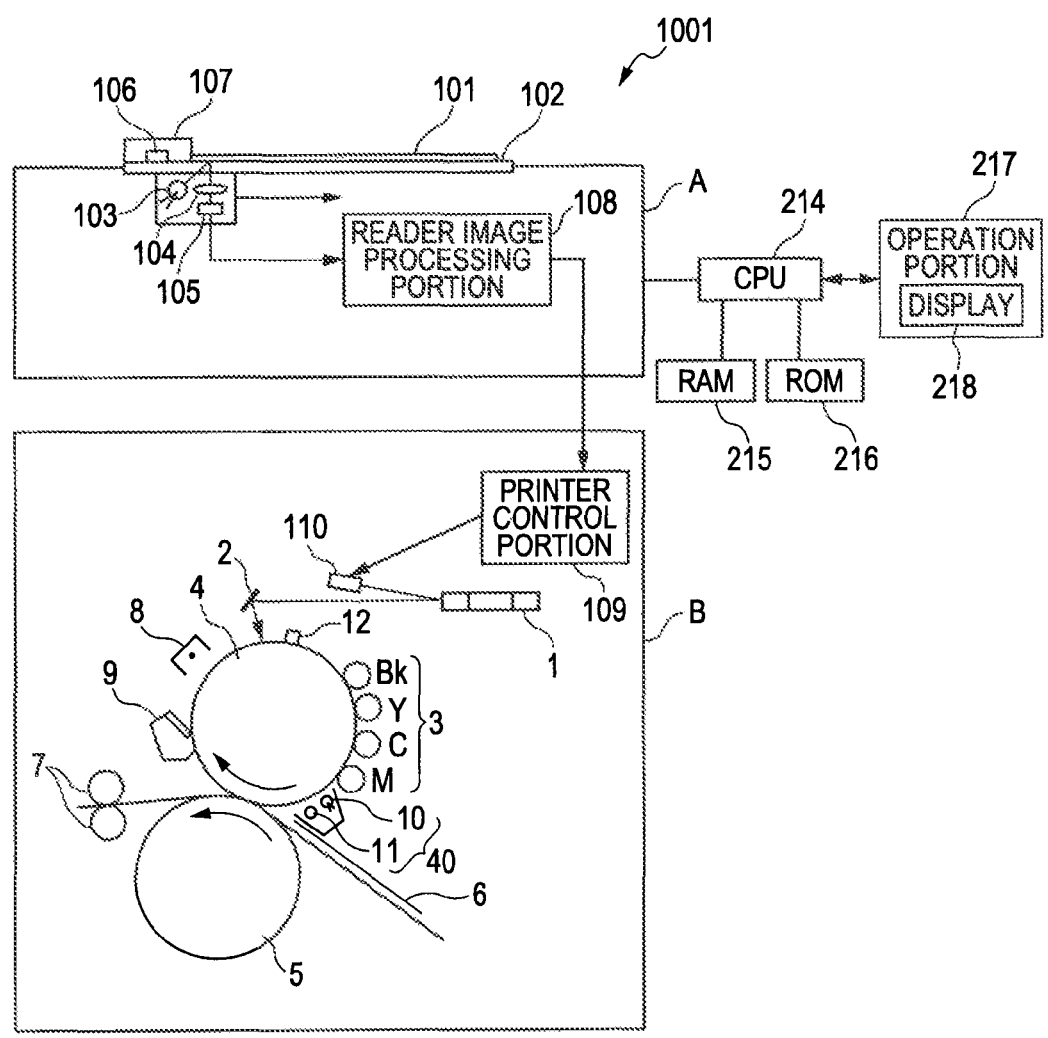
FIG. 1 is a schematic configuration diagram illustrating an image forming apparatus according to an exemplary embodiment of the present invention.

Referring to FIG. 1, an image forming apparatus according to a first exemplary embodiment of the present invention will be described. FIG. 1 illustrates an overall configuration of the image forming apparatus 1001 of the first exemplary embodiment.

A first control system which creates a γLUT based on a sequence different from that of normal image formation will be described below. A second control system which creates an image in a non-image portion during image formation and creates a correction table for the created γLUT will be described. In the image forming apparatus 1001 of the first exemplary embodiment, the first control system obtains a gamma curve, and the gamma curve is used to change a signal value of a tone pattern in the second control system.

(Reader Portion)

A document 101 placed on an original placing stand glass 102 of a reader portion A is illuminated by a light source 103, and reflected light from the document 101 forms an image on a CCD sensor 105 via an optical system 104. The CCD sensor 105 includes a group of red, green, and blue CCD line sensors arranged in three columns, and generates red, green, and blue color component signals for the respective line sensors. The light source 103, the optical system, and the CCD sensor 105 form a reading optical system unit, which is moved in a direction indicated by the arrow illustrated in FIG. 1, and converts an image on the document 101 into an electric signal for each line.

On the original placing stand glass 102, a positioning member 107 and a reference white plate 106 are arranged. The document 101 is placed such that one side thereof abuts to the positioning member 107, to thereby prevent the document 101 from being obliquely positioned. The reference white plate 106 is used for determining a white level of the CCD sensor 105 and performing shading correction in a thrust direction of the CCD sensor 105.

An image signal obtained by the CCD sensor 105 is subjected to image processing by a reader image processing portion 108 to be sent to a printer portion B, and processed by a printer control portion 109

A CPU 214 performs, by using a RAM 215 as a work memory, a control of a reader portion A or image processing, according to a program stored in a ROM 216. An operator inputs an instruction or processing conditions to the CPU 214 by an operation portion 217. A display 218 displays an operation state of the image forming apparatus and set processing conditions.

(Printer Portion)

In FIG. 1, in a printer portion B serving as an image forming unit configured to form a toner image, a surface of a photosensitive drum 4 as an image bearing member which rotates in the direction indicated by the arrow of FIG. 1 is uniformly charged by a primary charger 8. The printer control portion 109 uses a laser driver to output a pulse signal corresponding to input image data. A laser light source 110 outputs a laser beam corresponding to the input pulse signal. The laser beam is reflected on a polygon mirror 1 and a mirror 2 to scan the charged surface of the photosensitive drum 4. An electrostatic latent image is formed on the surface of the photosensitive drum 4 by the scanning with the laser beam.

The electrostatic latent image formed on the surface of the photosensitive drum 4 is developed, for each color, by a developing device 3 using toner of each color. In the first exemplary embodiment, two-component toner is used, and developing devices of respective colors are disposed around the photosensitive drum 4 in order of black Bk, yellow Y, cyan C, and magenta M, from the upstream side. The developing device 3 corresponding to an image forming color approaches the photosensitive drum 4 to develop the electrostatic latent image.

Recording paper 6 as a recording material is wound on a transfer drum 5 which rotates once for each color component. A total of four rotations of the transfer drum 5 results in transfer of a toner image of each color the recording paper 6 to be superimposed. After completion of the transfer, the recording paper 6 is separated from the transfer drum 5, and the toner is fixed by a fixing roller pair 7, to thereby complete a full-color image print.

Around the photosensitive drum 4, a surface potential sensor 12 configured to measure a surface potential of the photosensitive drum 4 is arranged on the upstream side of the developing device 3 (the head side of the arrow illustrated in FIG. 1 is downstream). The printer portion B further includes a cleaner 9 configured to clean remaining toner not transferred to the photosensitive drum 4, and a photo sensor 40 serving as a detection sensor configured to detect a reflected light amount of toner patches formed on the photosensitive drum 4. In the first exemplary embodiment, the photo sensor 40 includes an LED light source 10 and a photodiode 11.

Figure 2:
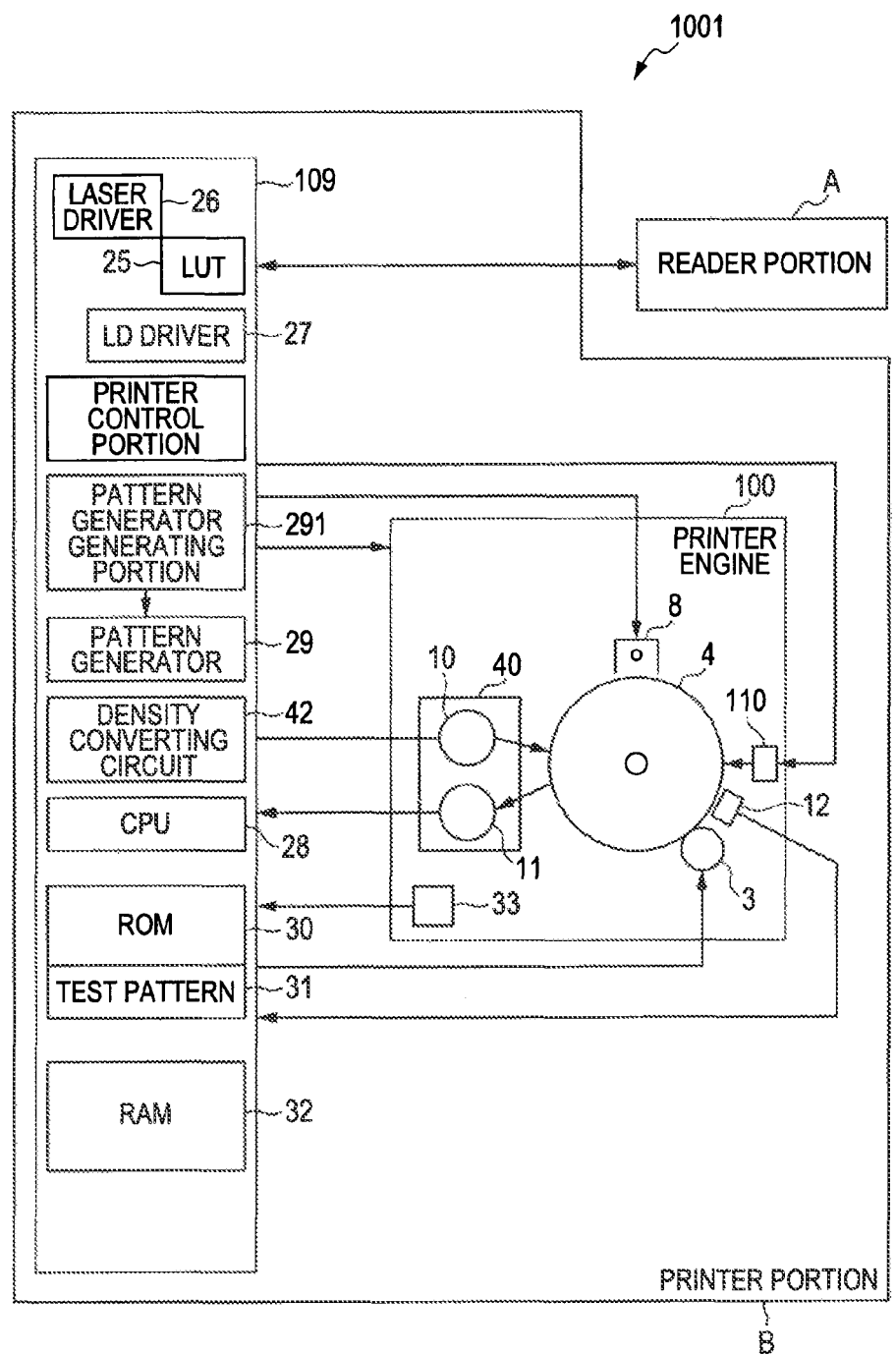
FIG. 2 is a block diagram illustrating a configuration example of a printer portion.

FIG. 2 is a block diagram illustrating a configuration example of the printer portion B.

The printer control portion 109 includes a CPU 28, a ROM 30, a RAM 32, a test pattern storage portion 31, a density converting circuit 42, a LUT (γLUT: γ conversion look-up table) 25, a laser driver 26, a pattern generator 29, and a pattern generator generating portion 291. The printer control portion 109 may communicate with the reader portion A and a printer engine 100. The CPU 28 controls an operation of the printer portion B, and controls a grid potential of the primary charger 8 and a developing bias of the developing device 3.

The printer engine 100 includes the photosensitive drum 4, and the photo sensor 40 which is formed of the LED light source 10 and the photodiode 11, the primary charger 8, the laser light source 110, the surface potential sensor 12, and the developing device 3, which are disposed around the photosensitive drum 4. The printer engine 100 further includes an environment sensor 33 configured to measure an amount of water vapor (or temperature and humidity) contained in air in the apparatus. A luminance signal of an image obtained by the CCD sensor 105 is converted into a frame-sequential density signal by the reader image processing portion 108. The density signal after the conversion is corrected in characteristics by the LUT (γLUT) 25 serving as a correction unit configured to correct image output characteristics for an image input signal, so that the density signal may correspond to gamma characteristics of the printer at the time of initial setting, that is, the density of the original image and the density of the output image may conform with each other.

Figure 3:
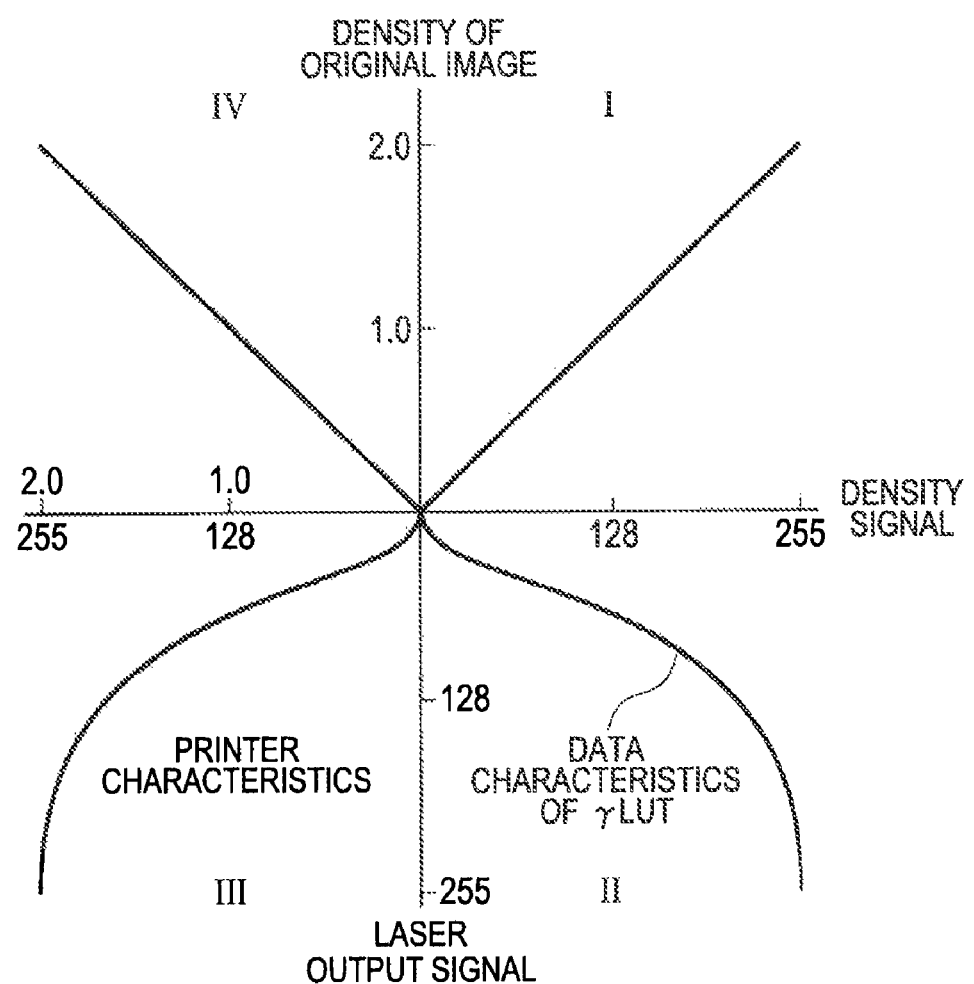
FIG. 3 is a four-quadrant chart illustrating how a tone is reproduced.

FIG. 3 is a four-quadrant chart illustrating how a tone is reproduced. A quadrant I illustrates reading characteristics of the reader portion A which converts a density of an original image into a density signal, and a quadrant II illustrates conversion characteristics (data characteristics) of the LUT 25 which converts the density signal into a laser output signal. A quadrant III illustrates recording characteristics (printer characteristics) of the printer portion B which converts the laser output signal into a density of an output image, and a quadrant IV indicates a relationship between the density of the original image and the density of the output image. More specifically, the four-quadrant chart of FIG. 3 illustrates total tone reproducing characteristics of the image forming apparatus 1001 illustrated in FIG. 1. The chart illustrates a case where the number of tones is 256, assuming that processing is performed based on an 8-bit digital signal.

In order to linearize the total tone characteristics by an image processing unit in the image forming apparatus 1001, more specifically, the tone characteristics of the quadrant IV, nonlinear portions of the printer characteristics of the quadrant III are corrected by the LUT 25 of the quadrant II. By the LUT 25, the image signal whose tone characteristics have been converted is converted into a pulse signal corresponding to a dot width, by a pulse width modulation (PWM) circuit of the laser driver, and sent to an LD driver 27 configured to control switching ON/OFF of the laser light source 110. In the first exemplary embodiment, a tone reproducing method based on pulse width modulation is used for all the colors of Y, M, C, and Bk.

Then, the photosensitive drum 4 is scanned with the laser beam output from the laser light source 110. As a result, an electrostatic latent image having predetermined tone characteristics where a tone is controlled based on a change in dot area is formed on the photosensitive drum 4. A tone image is reproduced through the process of the development, the transfer, and the fixing described above.

(First Control System)

Next, as image control in a sequence different from that of normal image formation for forming an image on recording paper, the first control system will be described. The first control system relates to stabilization of image reproducing characteristics of a system including both of the reader portion A and the printer portion B. The first control system is implemented at the time of initial installation of the apparatus. After that, as occasion demands, the user may arbitrarily implement the first control system when calibration is necessary.

First, the control system for calibrating the printer portion B by using the reader A will be described.

Figure 4:
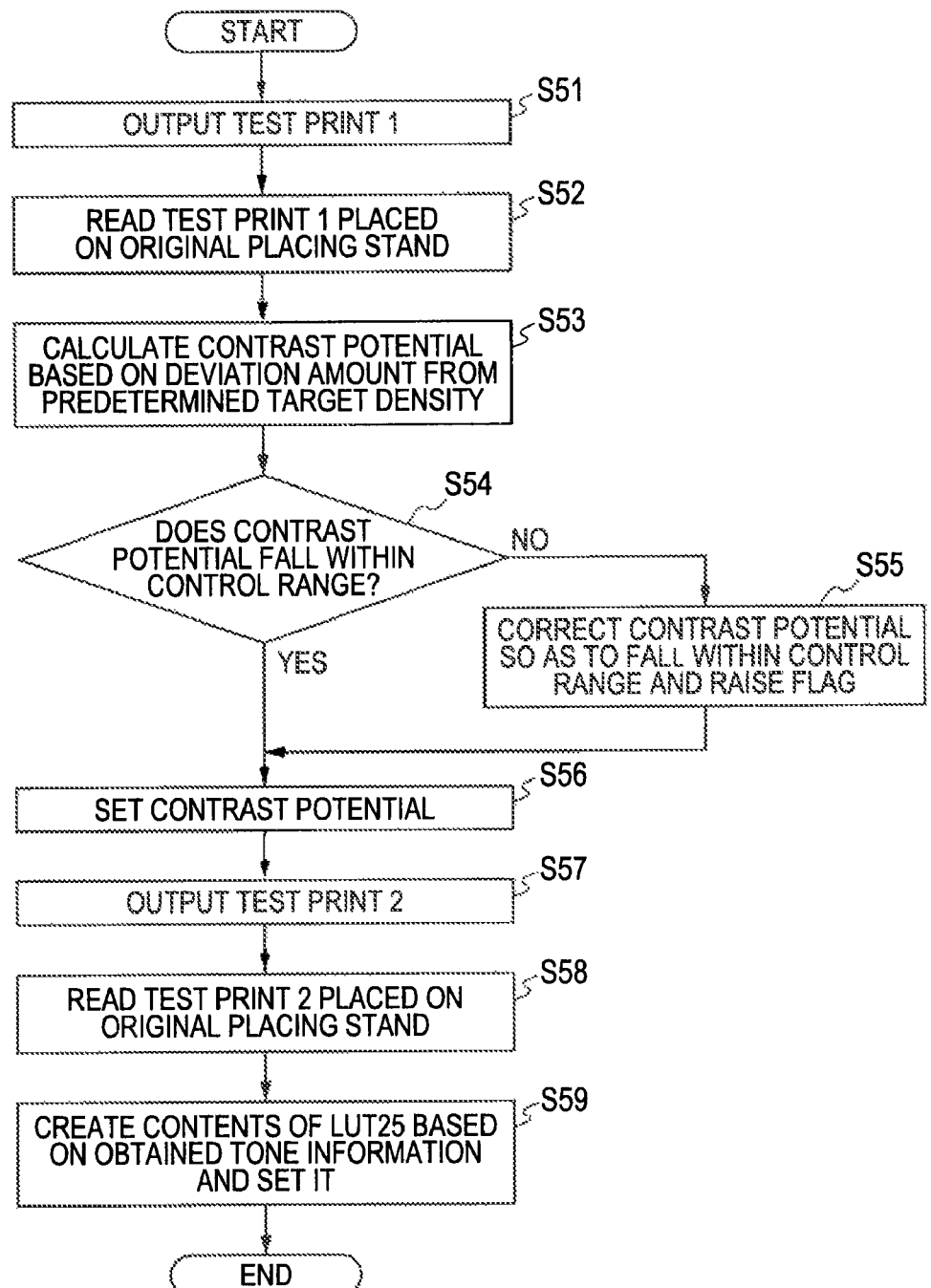
FIG. 4 is a flowchart illustrating an example of calibration.

FIG. 4 is a flowchart illustrating an example of calibration, which is realized by cooperation between the CPU 214 configured to control the reader portion A and the CPU 28 configured to control the printer portion B.

When the operator presses, for example, a mode setting button of "auto tone correction" disposed in the operation portion 217, the calibration illustrated in FIG. 4 is started. As illustrated in FIGS. 5A to 7E, the display 218 includes a liquid crystal operation panel with a touch sensor (touch panel display).

(Output of Test Print 1)

Figure 5A:
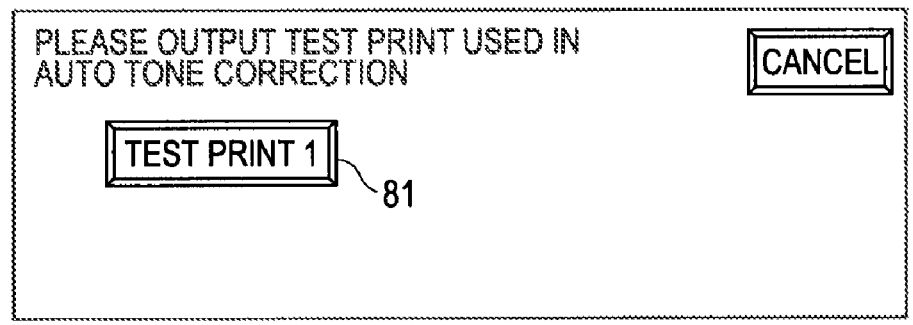
FIGS. 5A, 5B and 5C illustrate display examples of a display.
Figure 5B:
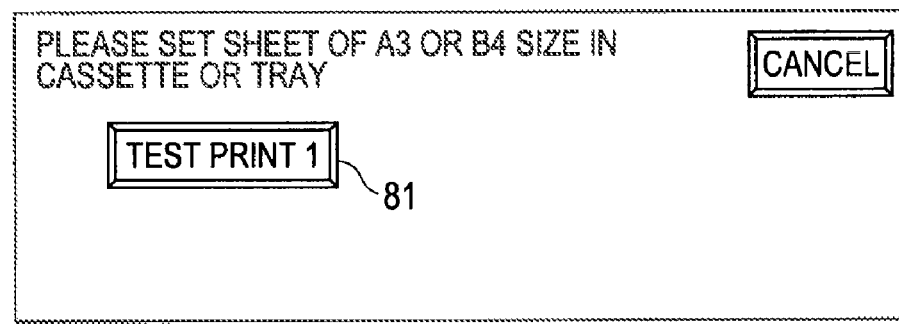
Figure 5C:
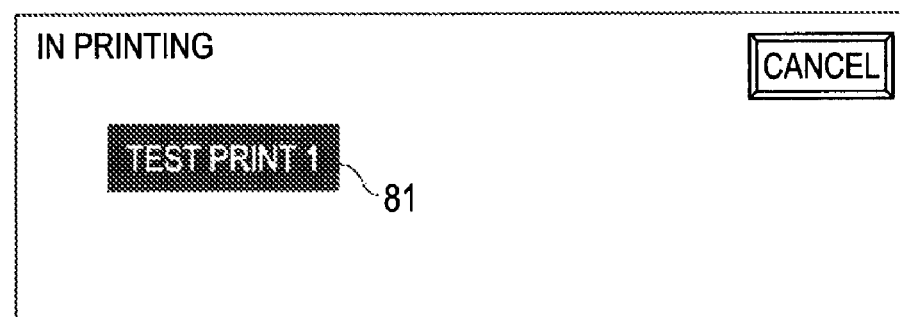

First, a start button 81 of a test print 1 illustrated in FIG. 5A appears on the display 218. When the operator presses the "test print 1" button, a test print 1 illustrated in FIG. 8 is printed out by the printer portion B (Step S51). A display of ongoing printing is as illustrated in FIG. 5C. At this time, the CPU 214 determines whether there is any recording paper for forming the test print 1. If there is no recording paper, the CPU 214 displays a warning as illustrated in FIG. 5B on the display 218.

Concerning a contrast potential for forming the test print 1, a contrast potential of a standard state corresponding to an environment is registered as an initial value to be used.

The contrast potential corresponds to a difference between a developing bias potential and a surface potential of the photosensitive drum 4 exposed to a laser beam modulated by a maximum signal value (255 in the case of an 8-bit signal) after the photosensitive drum 4 is uniformly charged.

The image forming apparatus 1001 includes multiple recording paper cassettes. Plural types of recording paper sizes such as B4, A3, A4, and B5 may be selected.

However, for the recording paper used for this control, in order to prevent an error of mistaking between vertical placement and horizontal placement in subsequent reading work, so-called large-size paper, specifically, B4, A3, 11×17, or LGR, is set to be used.

Figure 9:
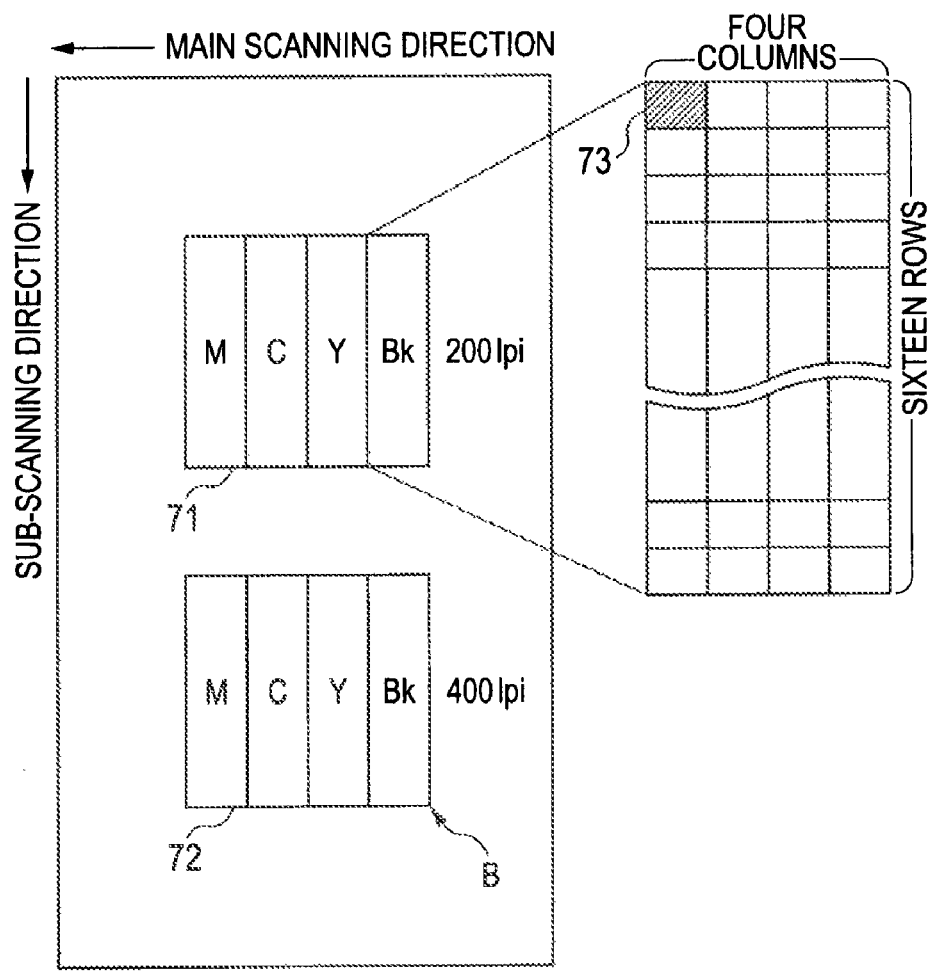
FIG. 9 illustrates an example of a test print 2.

As a test pattern (detection image) of the test print 1 illustrated in FIG. 8, a band pattern 61 based on an intermediate tone density of four colors of Y, M, C, and Bk is included. The pattern 61 is visually inspected so as to make sure that there is no abnormal stream image, no uneven density, or no uneven color. Sizes of a patch pattern 62, and tone patterns 71 and 72 illustrated in FIG. 9 are set to fall within a reading range of the CCD sensor 105.

When an abnormality is detected, the test print 1 is printed again. If the abnormality is detected again, a serviceman call must be placed, and more specifically, a serviceman must be called in for maintenance. The band pattern 61 may be read by the reading portion A, so as to automatically determine whether or not to perform control thereafter, based on density information of a thrust direction.

The patch pattern 62 is a patch pattern corresponding to a maximum density patch of each of the colors of Y, M, C, and Bk, that is, a density signal value 255.

Figure 6A:
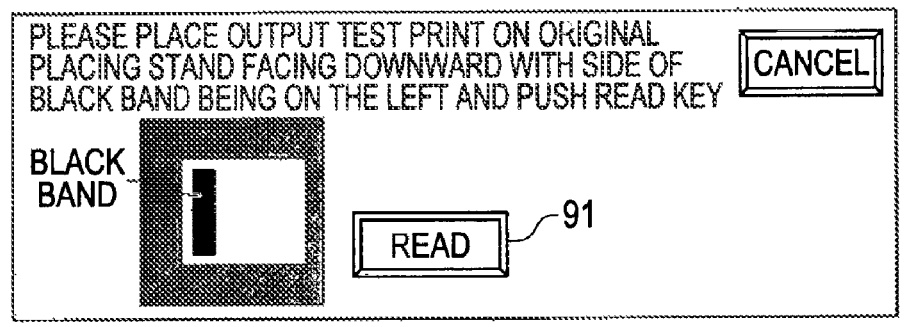
FIGS. 6A, 6B and 6C illustrate display examples of the display.
Figure 6B:
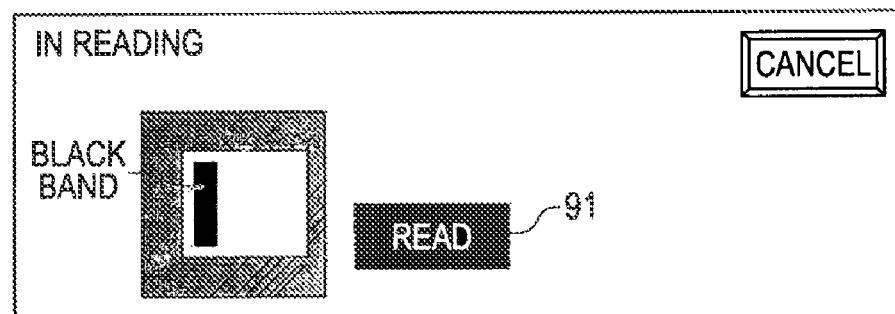

The operator places the test print 1 on the original placing stand glass 102, and presses a "read" button 91 illustrated in FIG. 6A. In this case, as illustrated in FIG. 6A, an operation guidance for the operator is displayed on the display 218.

Figure 6C:
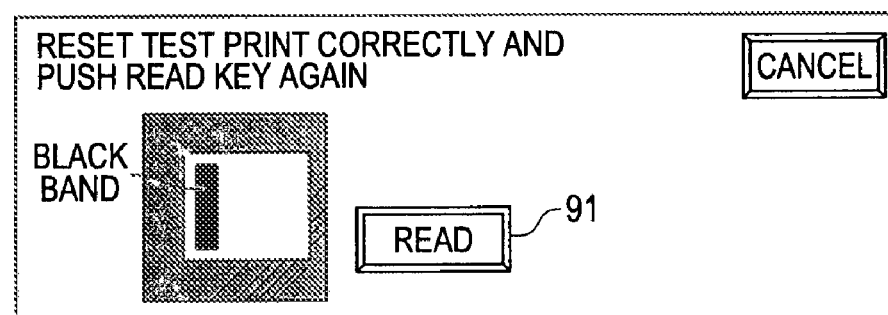

When reading the patch pattern 62, scanning is performed gradually from an abutment mark which is a mark disposed on the original placing stand glass 102 for abutment, to thereby obtain a first density gap point at a corner (point A of FIG. 8) of the band pattern 61. A relative position of each patch of the patch pattern 62 is determined based on the coordinates of the density gap point A, and a density of the patch pattern 62 is read (Step S52). During reading of the test print 1, display as illustrated in FIG. 6A is performed. When the test print 1 is wrong in orientation or position and unreadable, a message as illustrated in FIG. 6C is displayed so as to have the operator correct the arrangement of the test print 1 and press the "read" button 91, so that the test print 1 is read again.

The following equation is used for converting RGB values obtained from the patch pattern 62 into optical densities. In order to make values equal to those of a commercial densitometer, the values are adjusted by a correction coefficient k. Alternatively, an extra LUT may be used to convert luminance information of RGB into density information of M, C, Y, and Bk.

$$M = -km \times \log 10(G/255)$$

$$C = -kc \times \log 10(R/255)$$

$$Y = -ky \times \log 10(B/255)$$

$$Bk = -kk \times \log 10(G/255) \qquad (1)$$

Figure 10:
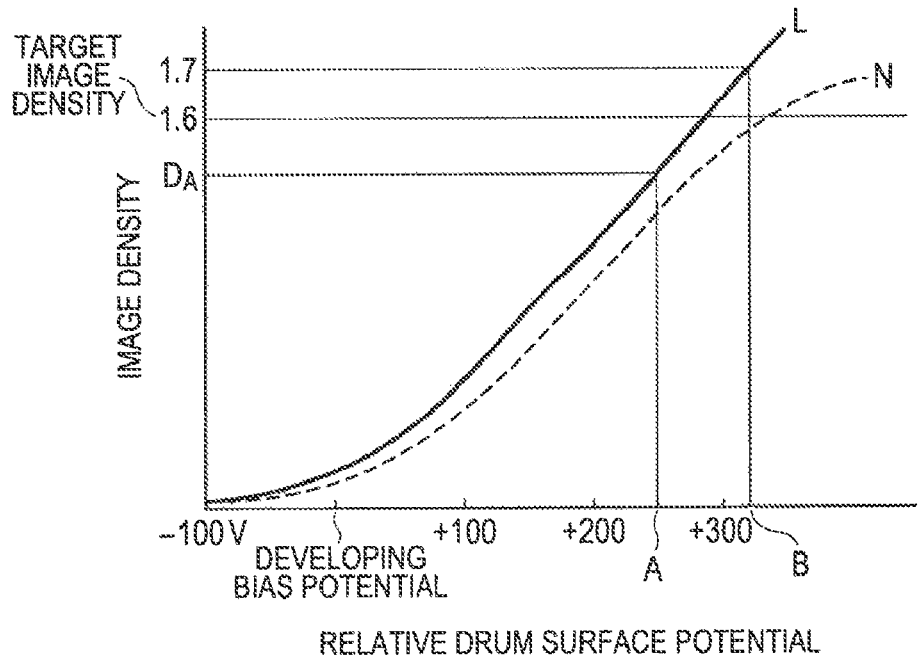
FIG. 10 is a graph illustrating a relationship between a relative drum surface potential of photosensitive drum and an image density.

Next, a method of correcting a maximum density based on the obtained density information will be described. FIG. 10 is a graph illustrating a relationship between a contrast potential ((surface potential of photosensitive drum 4)−(developing bias potential)) and the image density obtained by the above-mentioned calculation.

A contrast potential when the test print 1 printed (difference between a developing bias potential and a surface potential of the photosensitive drum 4 exposed to a laser beam modulated by a maximum signal value (255 in the case of an 8-bit signal) after the photosensitive drum 4 is primary-charged) is denoted by A illustrated in FIG. 1. A density obtained from the patch pattern 62 is denoted by DA.

In the maximum density area, image densities with respect to the contrast potential are almost linear as indicated by the solid line L of FIG. 10. However, in a two-component development system, when a toner density in the developing device 3 fluctuates to drop, as indicated by the broken line N of FIG. 10, image densities with respect to the contrast potential may be nonlinear in the maximum density area. Thus, in an example of FIG. 10, a target value of a final maximum density is 1.6. However, by making allowance for a margin of 0.1, a control target value of the maximum density is set to 1.7 to determine a control amount. The contrast potential B in this case is calculated by the following equation.

$$B=(A+Ka)\times 1.7/DA \quad (2)$$

In the equation (2), a value of a correction coefficient Ka may be optimized according to a type of a development system.

Figure 11:
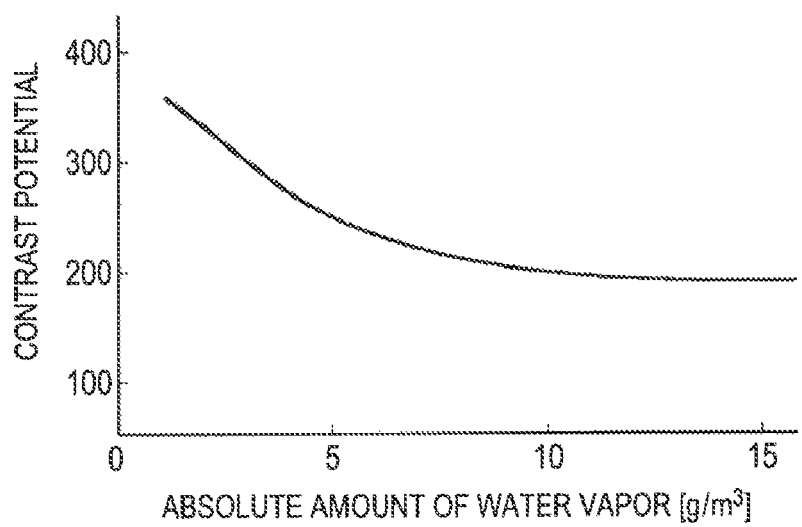
FIG. 11 is a graph illustrating a relationship between an absolute amount of water vapor and a contrast potential.

An electrophotographic contrast potential needs to be set according to an environment. Otherwise, an original image and an output image do not match each other in density. Thus, as illustrated in FIG. 11, a contrast potential corresponding to the maximum density is set, based on an output (absolute amount of water vapor) of the above-mentioned environment sensor 33 for monitoring the amount of water vapor in the apparatus.

Thus, in order to correct the contrast potential, a correction coefficient Vcont.rate1 in the following equation is saved in the backed-up RAM or the like.

$$Vcont.rate1=B/A$$

The image forming apparatus 1001 monitors an amount of water vapor in environment, for example, for every thirty minutes. Each time a value of the contrast potential A is determined based on a detection result of the amount of water vapor, A×Vcont.rate1 is calculated to obtain a contrast potential.

Next, a method of obtaining a grid potential and a developing bias potential based on the contrast potential is briefly described.

Figure 12:
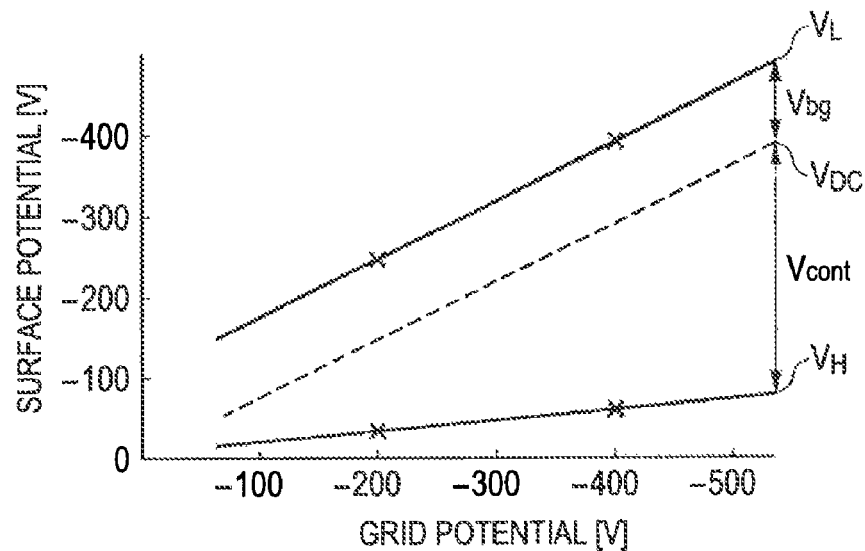
FIG. 12 is a graph illustrating a relationship between a grid potential and a surface potential.

FIG. 12 is a graph illustrating a relationship between a grid potential and a surface potential of the photosensitive drum 4. The grid potential is a potential of a voltage applied to a grid electrode of a corona charger used as the primary charger 8. The developing bias potential is a potential of a voltage applied to the developing device 3.

The grid potential is set to −200 V, and a surface potential VL of the photosensitive drum 4 exposed to a laser beam modulated based on a minimum signal value and a surface potential VH of the photosensitive drum 4 exposed to a laser beam modulated based on a maximum signal value are measured by the surface potential sensor 12. Similarly, a surface potential VL and a surface potential VH when a grid potential is set to −400 V are measured. Relationships between the grid potentials and the surface potentials are obtained by interpolating or extrapolating data of −200 V and data of −400 V. Control for obtaining the potential data is called "potential measurement control".

Then, a difference of Vbg (for example, 100 V) from the surface potential VL is set so as to prevent toner fogging in an image, to thereby set a developing bias VDC. A contrast potential Vcont is a difference potential between the developing bias VDC and the surface potential VH. As described above, as the contrast potential Vcont is larger, a maximum density is larger.

A grid potential and a developing bias for obtaining a contrast potential B obtained by calculation can be calculated based on the relationship illustrated in FIG. 12. Thus, the CPU 28 obtains a contrast potential so that a maximum density may be higher by 0.1 than a final target value, and determines a grid potential and a developing bias potential so as to obtain the contrast potential (Step S53).

Next, the CPU 28 determines whether or not the determined contrast potential falls within a control range (Step S54). If the contrast potential falls out of the control range (NO in Step S54), it is determined that there is an abnormality in the developing device 3 or the like, the CPU 28 raises an error flag so as to check the developing device 3 of a corresponding color. The serviceman can observe a state of the error flag in a predetermined service mode. When there is an abnormality, the CPU 28 corrects the contrast potential so as to barely fall within the control range, and continues the control (Step S55).

In order to obtain the contrast potential thus set, the CPU 28 controls the grid potential and the developing bias (Step S56).

In this exemplary embodiment, under the above-mentioned control, the grid potential of each of the colors Y, M, C, and Bk is determined to be −400 V, and the developing bias potential thereof is determined to be −280 V. In this exemplary embodiment, the above-mentioned control is performed for each of the colors Y, M, C, and Bk, and the grid potentials and the developing bias potentials are set equal among the colors.

(Output of Test Print 2)

Figure 7A:
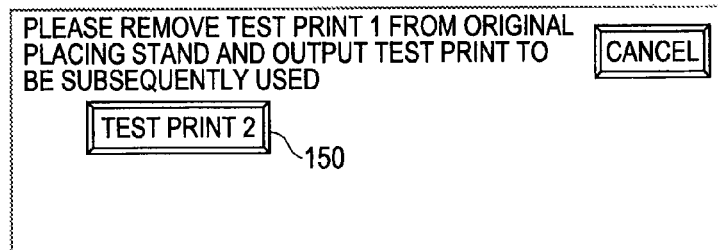
FIGS. 7A, 7B, 7C, 7D and 7E illustrate display examples of the display.
Figure 7B:
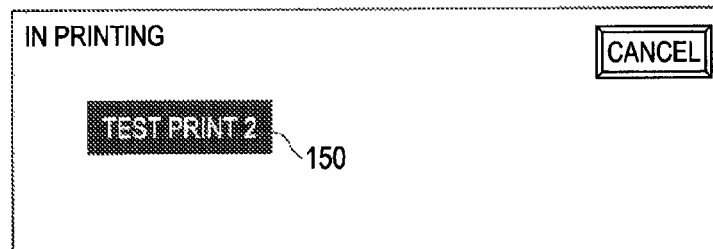
Figure 7C:
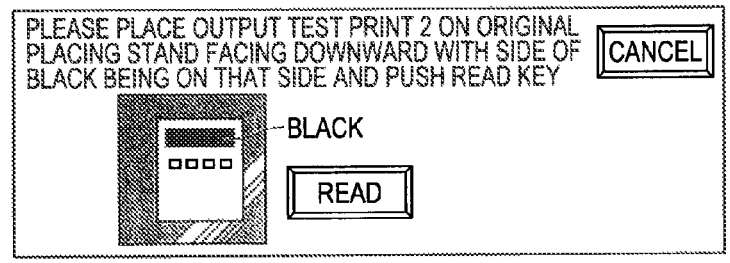

Next, as illustrated in FIG. 7A, a print start button 150 of a test print 2 appears on the display 218. When the operator presses a "test print 2" button, the test print 2 illustrated in FIG. 9 is printed out (Step S57). A display of ongoing printing is as illustrated in FIG. 7B.

As illustrated in FIG. 9, the test print 2 includes, for each of the colors Y, M, C, and Bk, a gradation patch group of 4×16 (64 tones) patches. The 64 tones among all the 256 tones are preferentially allocated to a low-density area. The tones are allocated this way in order to adjust tone characteristics well particularly in a highlight portion.

Specific examples of the density levels of the test print 2 are 0, 8, 16, 24, 32, 48, 64, 80, 104, 128, 152, 176, 200, 224, 248, and 255.

In FIG. 9, a patch pattern (tone pattern) 71 which is a detection image is a patch group having a resolution of 200 lpi (line/inch), and a patch pattern (tone pattern) 72 is a patch group having a resolution of 400 lpi. Image formation of each resolution is realized by preparing multiple periods of triangular-wage signals used for comparison with an image signal to be processed in the pulse width modulation circuit.

The image forming apparatus 1001 of this exemplary embodiment forms a tone image such as a photographic image by a resolution of 200 lpi and characters and lines by a resolution of 400 lpi based on an output signal of a black character determination portion. Patterns of equal tone levels may be output based on these two types of resolutions. However, when a difference in resolution greatly affects tone characteristics, patterns of tone levels corresponding to resolutions may be output.

The test print 2 is, without using the LUT 25, printed based on an image signal generated from the pattern generator 29 which decompresses and loads desired image data stored in a memory in a compressed state. A reason for generating the image signal from the pattern generator 29 without using the LUT 25 is to detect original engine characteristics which are image output characteristics with respect to the image input signal.

Figure 7D:
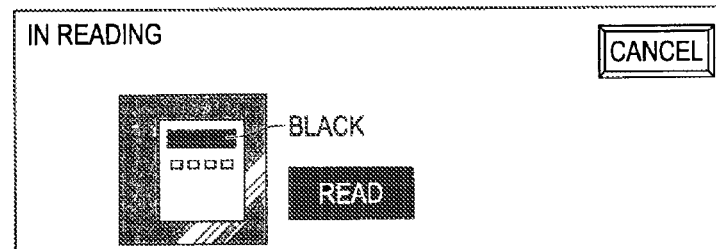

When reading the patch patterns 71 and 72, scanning is performed gradually from an abutment mark, to thereby obtain a first density gap point at a corner (point B of FIG. 9) of the patch pattern 72. Relative positions of patches of the patch patterns 71 and 72 are determined based on the coordinates of the density gap point B, and densities of the patch patterns 71 and 72 are read (Step S58). During reading of the test print 2, display as illustrated in FIG. 7D is performed.

A reading value of one patch (for example, patch 73 of FIG. 9) is an average of values obtained by setting 16 points in the patch and reading the 16 points. The number of reading points may be optimized by a reading apparatus and the image forming apparatus.

Figure 13:
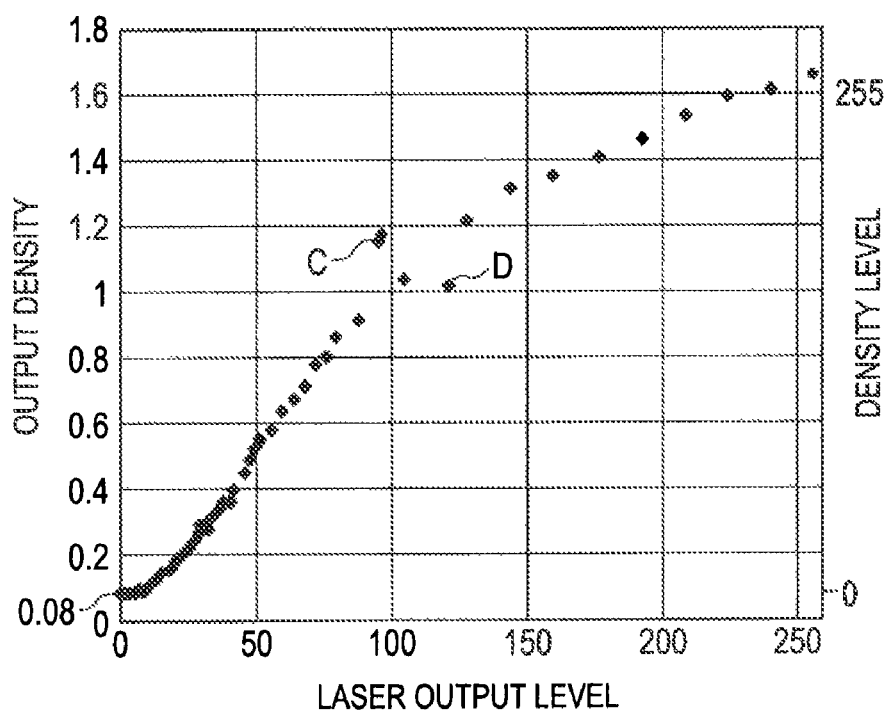
FIG. 13 is a graph for illustrating density reading points of patches.

FIG. 13 is a graph illustrating a relationship between output densities resulting from converting RGB signals obtained from each patch into density values by the above-mentioned conversion method into optical densities and a laser output level (value of image signal). As indicated by an ordinate axis of the right side of FIG. 13, a background density (for example, 0.08) of recording paper is set to 0, and a target value 1.60 of a maximum density is normalized to 255.

When a read patch density is specifically high as indicated by a point C of FIG. 13, or specifically low as indicated by a point D, a stain on the original placing stand glass 102 or a test pattern defect may be a cause. In such a case, in order to maintain continuity of a data string, a limiter is set on a slope of the data string to make correction. For example, the slope is fixed to 3 when the slope of the data string exceeds 3, and data having a minus slope is set to a value equal to that of a patch of one-level lower density.

Conversion characteristics reverse to characteristics of FIG. 13 are set in the LUT 25 (Step S59). More specifically, the CPU 28 serving as the LUT creating unit creates a LUT 25 by setting a density level to an input level (density signal of FIG. 3) and a laser output level to an output level. A level not corresponding to the patch is obtained by interpolation calculation. In this case, conditions are set so that a zero output level may be set with respect to a zero input level.

Figure 7E:
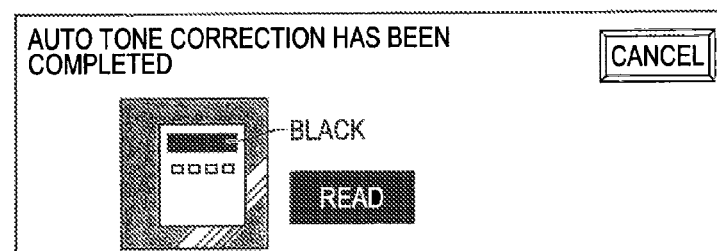

Thus, the control of the contrast potential and the creation of the gamma conversion table by the first control system are completed, and display of the display 218 is as illustrated in FIG. 7E. In this tone control, the laser output is controlled so as to associate the input image signal with a final image recorded on paper as a transfer material. Thus, the control becomes highly accurate, and an output image having high tone accuracy may be obtained. However, the transfer material must be read, and hence the control may not be performed frequently. Thus, the following second control system is performed multiple times in the interval of the first control system, to thereby realize long-time stabilization of image reproducing characteristics.

(Second Control System)

Next, the second control system for realizing long-time stabilization of image reproducing characteristics obtained by the first control system will be described.

Toner used in this exemplary embodiment is color toner of yellow, magenta, and cyan, and color materials of the respective colors are dispersed by using a styrene-based copolymer resin as a binder. The photosensitive drum 4 is an OPC drum having a reflectance of near infrared light (960 nm) set to about 40%. However, the photosensitive drum 4 may be an amorphous silicon-based photosensitive drum as long as a reflectance is about this level. The photo sensor 40 is configured so as to detect only specular reflected light from the photosensitive drum 4.

Figure 14:
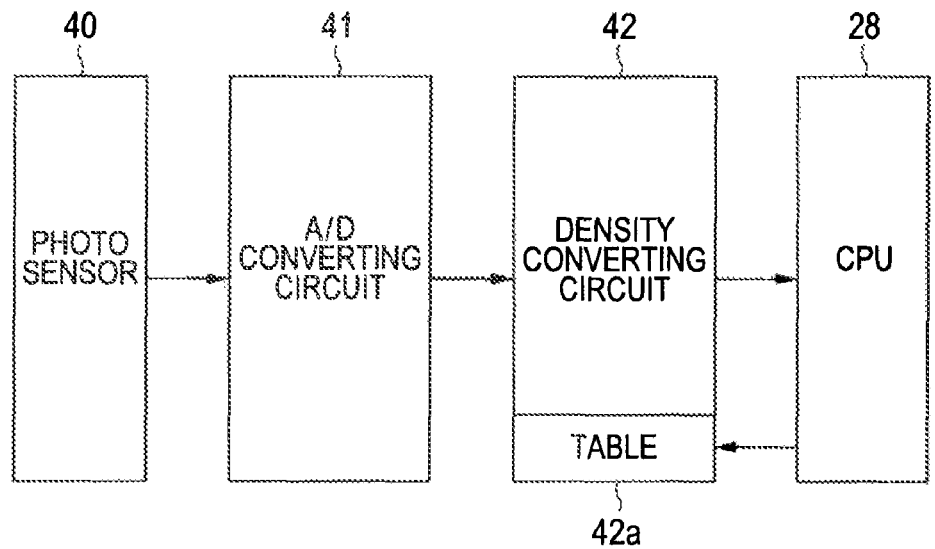
FIG. 14 is a block diagram illustrating an output signal processing circuit configuration of a photo sensor according to an exemplary embodiment.

FIG. 14 is a block diagram illustrating a configuration example of circuits for processing an output signal of the above-mentioned photo sensor 40. Reflected light (near infrared light) from the photosensitive drum 4 input to the photo sensor 40 is converted into an electric signal. The electric signal of 0 to 5 V is converted into an 8-bit digital signal by an A/D converting circuit 41, and converted into density information a density converting circuit 42.

Figure 15:
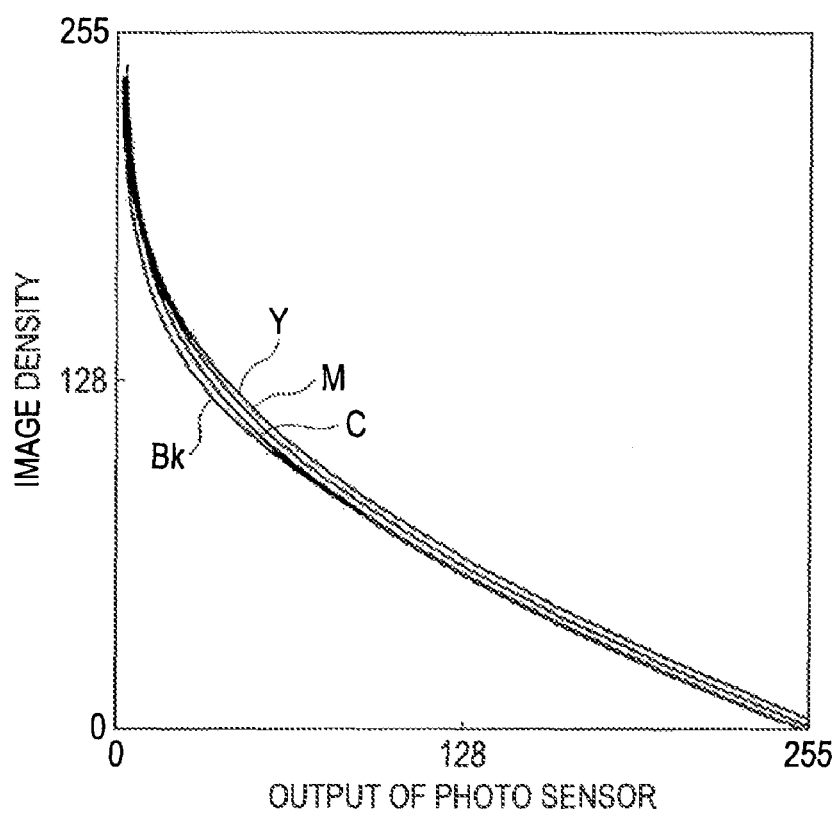
FIG. 15 is a graph illustrating a relationship between an output of the photo sensor and an image density.

FIG. 15 is a graph illustrating a relationship between an output of the photo sensor 40 and a density of an output image when densities of patches formed on the photosensitive drum 4 are changed in stages based on an area coverage modulation of each color. An output of the photo sensor 40 when there is no toner stuck to the photosensitive drum 4 is set to 5 V, that is, the level of 255. As illustrated in FIG. 15, as an area covering ratio by each toner is larger and an image density is larger, the output of the photo sensor 40 is smaller.

By using these characteristics, a table 42a is created for conversion from an output signal of each color-dedicated sensor into a toner image density on the photosensitive drum. As a result, toner image density of each color may be accurately obtained.

The change in toner image density may correspond to a final image density on the paper. Thus, in the second control system, a change in apparatus characteristics is estimated based on the change in toner image density when the same image signal is input, and correction is made so that an output image density with respect to the image signal may be linear.

FIG. 16A is a flowchart illustrating the second control for setting a reference density value. This control is realized by the CPU 28.

The CPU 28 executes the above-mentioned first control (auto tone correction) to set a LUT 25 (Step S271).

The CPU 28 controls each device in the printer portion B, and forms a patch pattern of each of the colors Y, M, C, and Bk on the photosensitive drum to develop the patterns (Step S272). The CPU 28 detects the developing patch based on a signal from the photo sensor 40 (Step S273).

In an image processing apparatus of this exemplary embodiment, the second control for correction is performed at the time of turning ON a main switch of the image processing apparatus, after the elapse of a predetermined period of time from a time when the main switch has been turned ON, or in response to sensor outputs of a temperature sensor and a humidity sensor (not shown) configured to detect environmental changes (FIG. 16B).

A sequence of the control and an output signal are similar to conditions at the time of reference density acquisition.

When the main switch is turned ON, as in the case of Step S272, the CPU 28 forms developing patches on the photosensitive drum by using the LUT 25 obtained in the first control system (Step S275). In this case, a patch of each color is formed based on a laser output (obtained based on the LUT 25) corresponding to an image signal of 96.

The CPU 28 then detects densities of the developing patches based on a signal from the photo sensor 40 (Step S276). The CPU 28 compares the measured developing patch densities with a reference patch density to obtain a difference therebetween.

Figure 17:
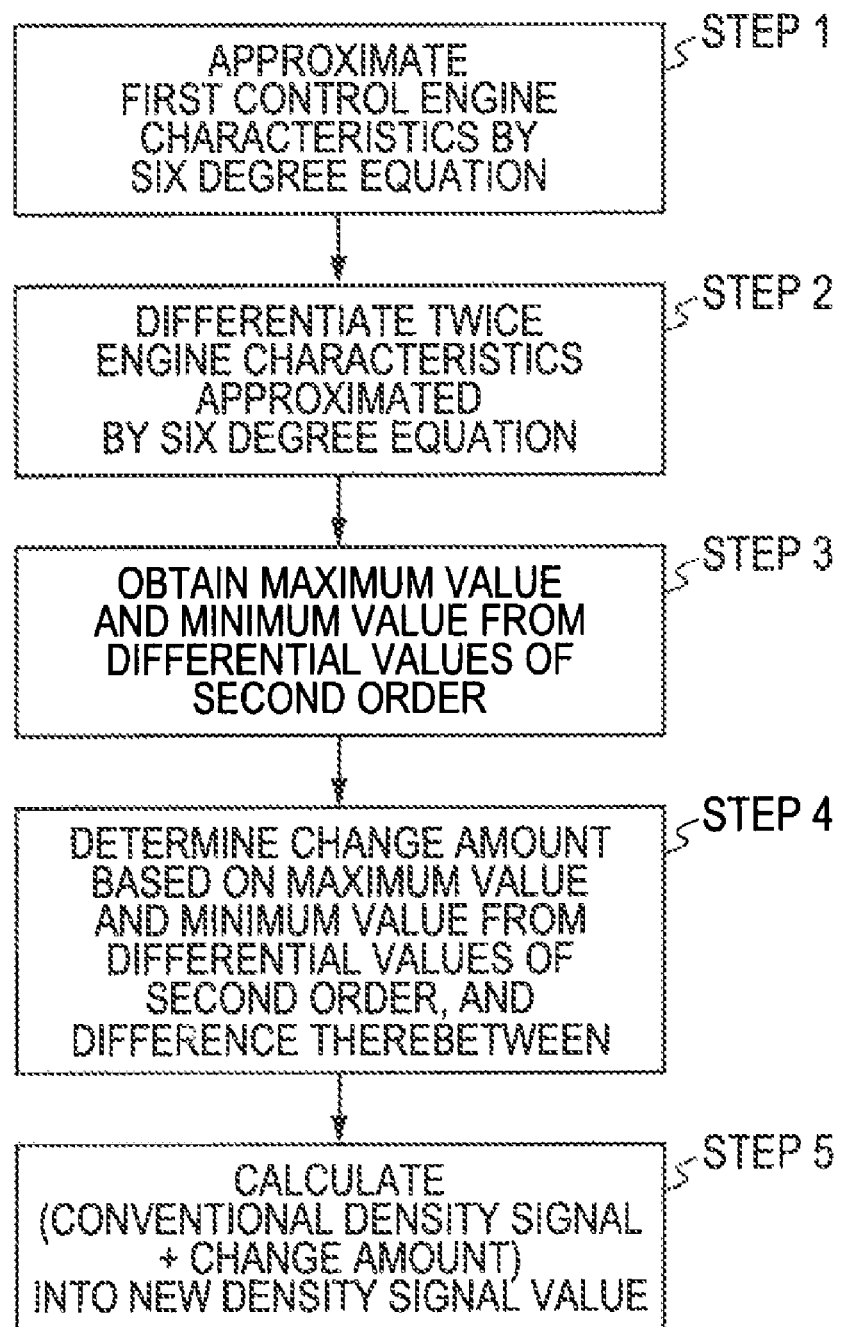
FIG. 17 illustrates a sequence of forming a patch image on the photosensitive drum.

Next, steps of FIG. 17 are described. For a laser output of a patch of each color, seven levels at a density signal (image signal) are used. This exemplary embodiment is characterized by making a level of each density signal variable based on a result of the first control system.

(Method of Determining Each Density Signal Level)

Figure 18:
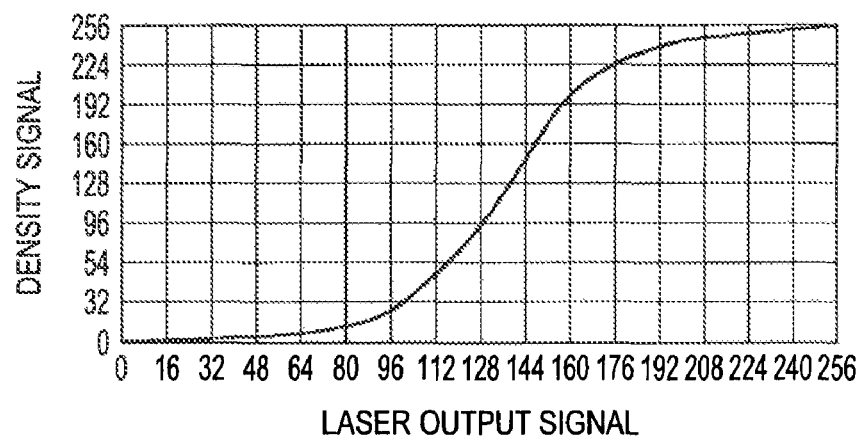
FIG. 18 is a graph illustrating engine characteristics.

FIG. 18 illustrates engine characteristics obtained by the first control system. First, in Step 1, the CPU 28 approximates the engine characteristics obtained by the first control system by a six degree equation. In Step 2, the CPU 28 performs the second order differentiation so as to detect an area where a rate of slope change of a gamma curve is large. Table 1 shows coefficients and orders thereof. As a result, a graph of differential values of second order illustrated in FIG. 19 is obtained.

TABLE 1

| Function | Degree | Differential coefficient of first order | Degree | Differential coefficient of second order | Degree |
|---|---|---|---|---|---|
| $2.98487 \times 10^{-11}$ | 6 | $1.79092 \times 10^{-10}$ | 5 | $8.95 \times 10^{-10}$ | 4 |
| $-2.06779 \times 10^{-8}$ | 5 | $-1.0339 \times 10^{-7}$ | 4 | $-4.1 \times 10^{-7}$ | 3 |
| $4.88163 \times 10^{-6}$ | 4 | $1.95265 \times 10^{-5}$ | 3 | $5.86 \times 10^{-5}$ | 2 |
| $-0.000453866$ | 3 | $-0.0013616$ | 2 | $-0.00272$ | 1 |
| $0.018510456$ | 2 | $0.037020911$ | 1 | $0.037021$ | 0 |
| $0.096260288$ | 1 | $0.096260288$ | 0 | 0 | 0 |

Figure 19:
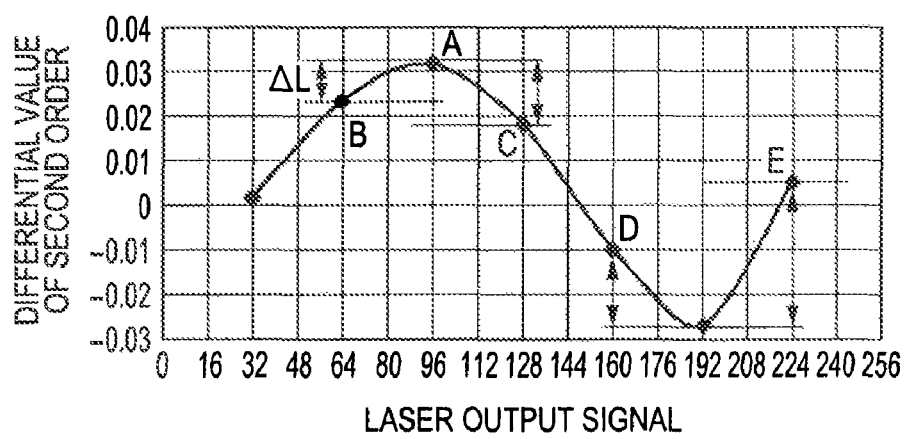
FIG. 19 is a graph illustrating second-order differential characteristics of the engine characteristics.

In Step 3, the CPU 28 obtains a maximum value and a minimum value of the differential values of second order from FIG. 19. In this case, the maximum value is obtained when a laser output signal is 96, and the minimum value is obtained when a laser output signal is 192. Density signals at the time of shipment of seven tone patches are 32, 64, 96, 128, 160, 192, and 224. These values are initial values when the patches are placed at almost equal patch intervals so as to uniformly detect engine characteristics. In Step 4, the CPU 28 determines density signals of the patches based on the initial values and the maximum value and the minimum value of the differential values of second order.

A maximum value or a minimum value in the case where the gamma curve has a large change constitutes a signal of a tone patch that is always formed. According to a difference from the closest maximum value or minimum value, the CPU 28 changes density signals of two tone patches before and after the maximum value or the minimum value. Specifically, a change amount of a density signal is expressed by ((density signal where differential value of second order is largest)−(density signals of before and after))×a. The correction coefficient "a" is used for adjusting an amount where the density signal approaches the maximum value. In designing, the change amount is determined based on control frequency or correction accuracy. In this case, a=0.1 is set.

In Step 5, the CPU 28 calculates ((conventional density signal)+(change amount)) into a new density signal value. When calculated at the point B, the change amount is (96−64)×0.1=3.2. In this exemplary embodiment, the change amount is set to 3 by rounding down the value to the closest whole number. A new density signal at the point B is 64+3=67. Next time the second control is performed, the density signal of 67 is used.

Similar calculation is performed for the minimum value. The density signal may be changed when a difference between the maximum value or the minimum value and the density signal to be changed before or after the maximum value or the minimum value is at least 2. In this exemplary embodiment where the maximum density is 1.6 and the number of signals is 255, one signal level corresponds to a density of 1.6/255=0.006. When density detection accuracy of the photo sensor is estimated to be about 0.01, two levels may be detected based on a signal. Further, considering density stability of the engine, in this exemplary embodiment, the density signal is not changed when a difference between density signals is 10 or less.

Thus, in this exemplary embodiment, based on a rate of slope change of the LUT to be corrected for each patch formation, the density level for next patch formation is changed. Specifically, patch density levels are changed so that patches may be preferentially formed in a density area where an absolute value of the rate of slope change of the LUT to be corrected is large.

Figure 20:
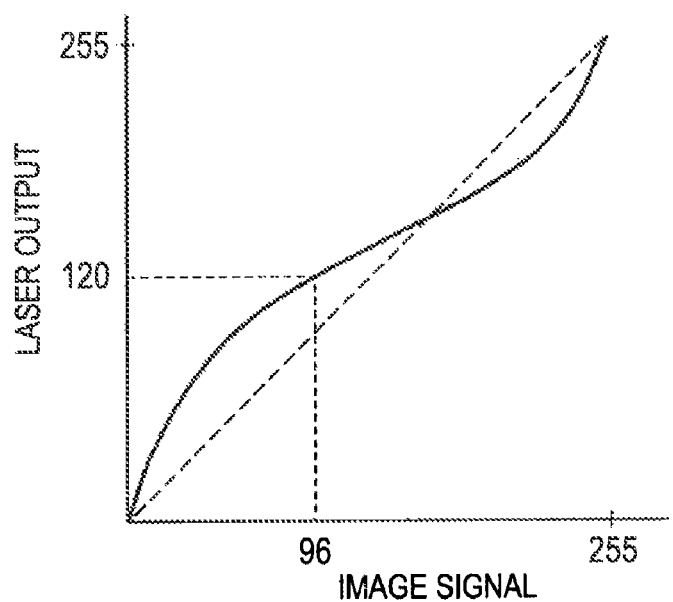
FIG. 20 illustrates a look-up table.

An output signal is determined based on the LUT created under the first control. For example, in the case of a LUT illustrated in FIG. 20, when an input signal is 96, an output signal is the level of 120. The LUT is set for each color, and hence an output signal is set for each color.

The LUT 25 created under the first control is stored in another place. For each repetition of the second control for correction, the LUT 25 may always be maintained at initial characteristics.

In many cases, the image processing apparatus is normally switched OFF at night, and switched ON in the morning. Thus, the second control system is often activated several times a day.

On the other hand, the first control system may not be performed frequently as it necessitates human work.

Thus, in installation work of the image processing apparatus, the serviceman executes the first control system. If no problem occurs in an image, by the second control system, characteristics are automatically maintained within a short period of time. When a change gradually occurs over a long period of time, on the other hand, calibration is performed by the first control system. That is, roles are divided between the first control system and the second control system. As a result, tone characteristics may be maintained until a life end of the image processing apparatus.

As described above, the auto tone correction corresponding to the first control is performed to create a LUT. Based on the LUT, the developing patch reading corresponding to the second control is performed for obtaining a reference density. The obtained reference density is set as a reference density for the patch sensor. Based on the reference density, according to a change amount with respect to the patch density value of the second control for correction executed thereafter, the created LUT is corrected by auto tone correction. As a result, image density characteristics obtained by the auto tone correction may be maintained over a long period of time.

In this exemplary embodiment, the image is formed by the laser. However, in addition to the laser, this exemplary embodiment may be applied to an exposure device such as a LED.

(Second Exemplary Embodiment)

Figure 21:
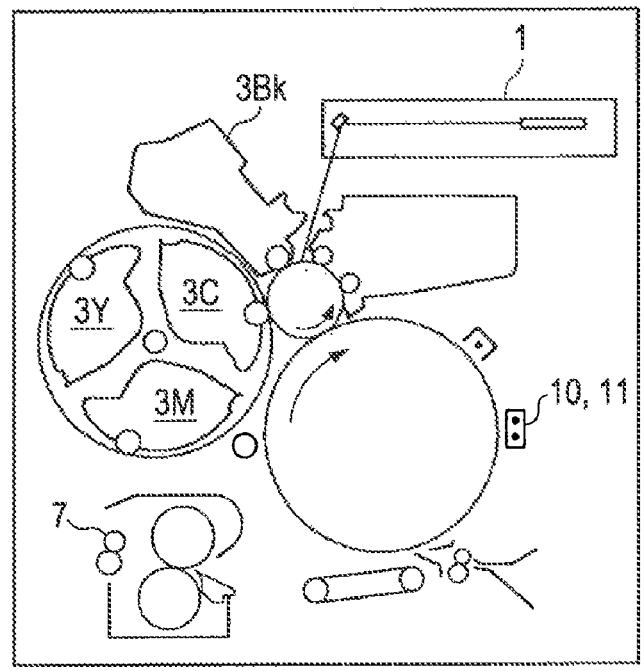
FIG. 21 is a schematic configuration diagram of an image forming apparatus according to another exemplary embodiment of the present invention.

This exemplary embodiment is directed to an image processing apparatus which uses an intermediate transfer member. In second control of this exemplary embodiment, a photo sensor is disposed on the intermediate transfer member to detect a density of a developing patch. FIG. 21 illustrates a printer portion of the image processing apparatus of this exemplary embodiment. A rotary developing device is used and development cartridges of yellow, magenta, and cyan are mounted in a rotary. Each development cartridge is appropriately moved to a developing position when necessary, to thereby develop an image. A black cartridge is stationary, and a period of time necessary for rotating the rotary developing device is saved when only a black color is used.

Toner images formed on the photosensitive drum based on image information of respective colors are sequentially transferred to the intermediate transfer member. In the case of full-color printing, four color toners are transferred to the intermediate transfer member. Then, the images are transferred en bloc to a recording material fed from a paper feeding unit, fixed by a fixing device, and discharged out of the apparatus, to thereby form a full-color print.

Incidentally, a charging device of the photosensitive drum in the image processing apparatus of this exemplary embodiment uses a contact charging system. For a high voltage to be applied, an AC bias (constant current) for obtaining uniform charging and a DC bias (constant voltage) for determining a charging potential are applied. As is well known, in the contact charging system where the AC bias and the DC bias are superimposed, deterioration of the photosensitive drum, in particular, abrasion of a surface layer, is conspicuous. When the corona charger of the first exemplary embodiment is used, an amount of abrasion is about 1 μm at 100,000 rotations. On the other hand, in the contact charging system of this exemplary embodiment where the AC bias and the DC bias are superimposed, an amount of abrasion is about 12 μm at 100,000 rotations.

Fluctuation factors of patch reading thus increase on the photosensitive drum. Hence, this arrangement is not so advantageous from the standpoint of long-time stability.

In contrast, the intermediate transfer member has a smaller number of deterioration factors as compared with the photosensitive drum, and hence more stabilization may be realized.

Thus, as described above, the sensor of the second control of the image processing apparatus according to this exemplary embodiment is disposed on the intermediate transfer member.

As described above, also in this exemplary embodiment, the auto tone correction corresponding to the first control is performed to create a LUT. Based on the LUT, a patch is formed on the intermediate transfer member, and the developing patch reading corresponding to the second control is performed for obtaining a reference density. Based on the obtained reference density for the patch sensor and a change amount with respect to the patch density value of the second control for correction executed thereafter, the created LUT is corrected by auto tone correction. As a result, image density characteristics obtained by the auto tone correction may be maintained for a long period of time.

In this exemplary embodiment, the cause of the change of the photosensitive drum is abrasion. Needless to say, however, the exemplary embodiment may be applied to various change factors such as deterioration caused by an electric discharge product and flaws caused by a cleaning process.

In this exemplary embodiment, the patch reading is performed on the intermediate transfer member. However, the present invention may be applied if a developing patch reading component such as a transfer belt for conveying a recording material is provided. In this exemplary embodiment, the reflective sensor is provided. However, a component such as a transmissive sensor may apparently be employed if a highly transmissive material is used for the intermediate transfer member or the transfer belt. In this exemplary embodiment, the image is formed by the laser. However, the present invention is not limited to this, and needless to say, the present invention may be applied to an image forming apparatus which uses an exposure device such as a LED.

The present invention may be applied to a system which includes multiple devices (for example, host computer, interface device, reader, and printer), or an apparatus (for example, copying machine or facsimile device) which includes one device.

In each of the exemplary embodiments, the photosensitive drum is exemplified as the image bearing member for bearing the electrostatic latent image or the toner image. However, the present invention may be applied to a photosensitive belt which is a belt-shaped image bearing member having a photosensitive layer on its surface. In this case, density information which is input information of the second control system may be obtained from a patch image formed on the photosensitive belt.

As described above, according to the present invention, the frequently executable image control which needs shorter time and smaller labor may be provided.

Signal values of patch images are constantly optimized while normal image formation continues. By repeating correction, image control high in accuracy and high in tone stability of an output image may be performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-134515, filed Jun. 3, 2009, which is hereby incorporated by reference herein in its entirety.

What is claimed is:

1. An image forming apparatus, comprising:
   an image bearing member;
   an image forming unit configured to form a toner image on the image bearing member based on an image input signal;
   a detection sensor configured to detect a detection image at multiple density levels, which is formed by the image forming unit;
   a correction unit configured to correct image output characteristics of the image forming unit with respect to the image input signal, based on a detection result of the detection sensor; and
   a change unit configured to change the multiple density levels at which the detection image is formed so that the detection image is preferentially formed in a density area in which an absolute value of a rate of change of slope of the image output characteristics is large.

2. An image forming apparatus according to claim 1, wherein the correction unit configured to correct the image output characteristics with respect to the image input signal comprises a γ conversion look-up table, and the change unit changes the multiple density levels at which the detection image is formed, based on differential values of second order of the γ conversion look-up table.

3. An image forming apparatus according to claim 1, wherein the change unit changes the multiple density levels at which the detection image is formed, based on a maximum value and a minimum value of differential values of second order of a γ conversion look-up table.

* * * * *